W. CLOUSER.
HUSKING MACHINE.
APPLICATION FILED OCT. 6, 1908.
941,229.
Patented Nov. 23, 1909.
3 SHEETS—SHEET 1.
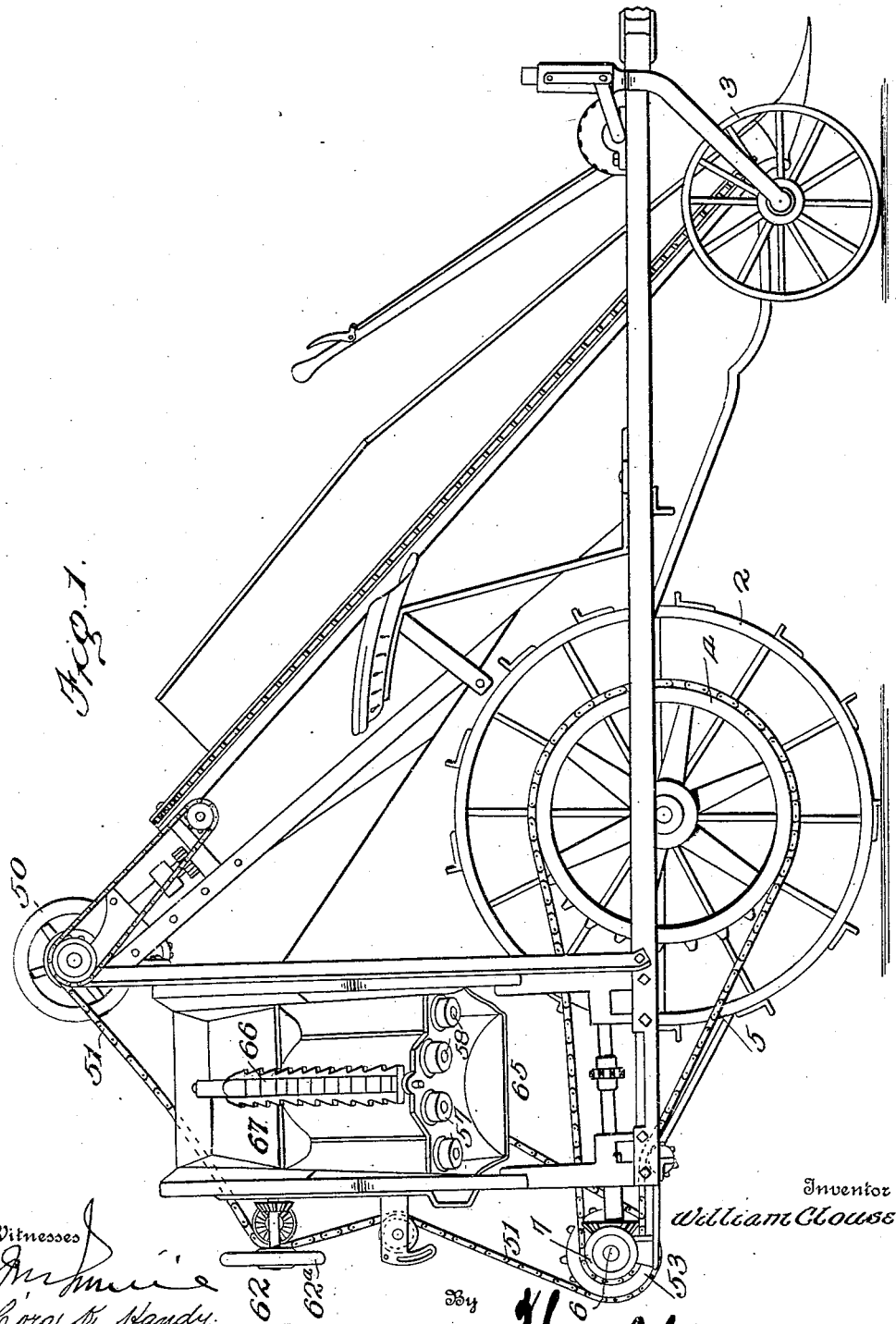

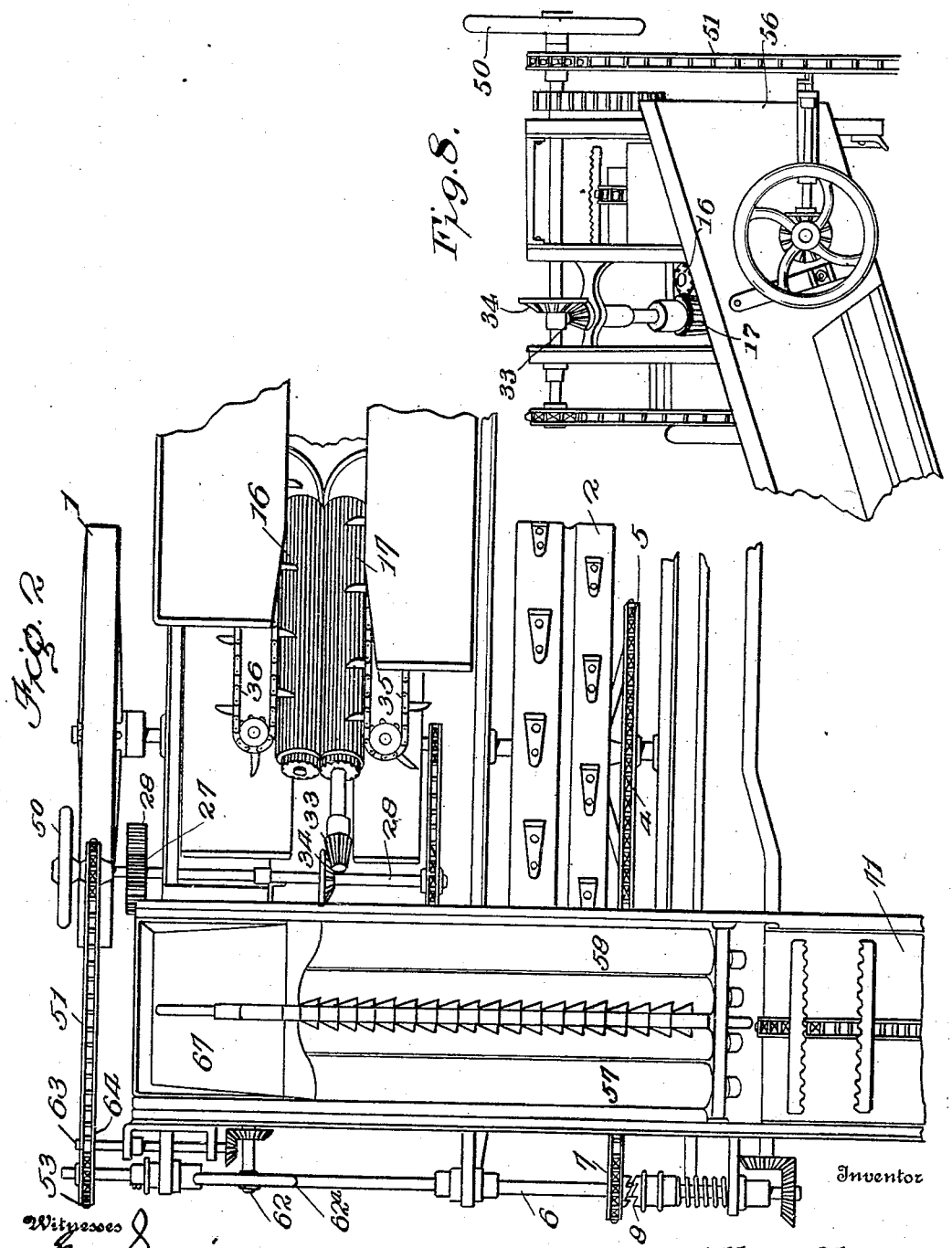

W. CLOUSER.
HUSKING MACHINE.
APPLICATION FILED OCT. 6, 1908.
941,229.
Patented Nov. 23, 1909.
3 SHEETS—SHEET 3.
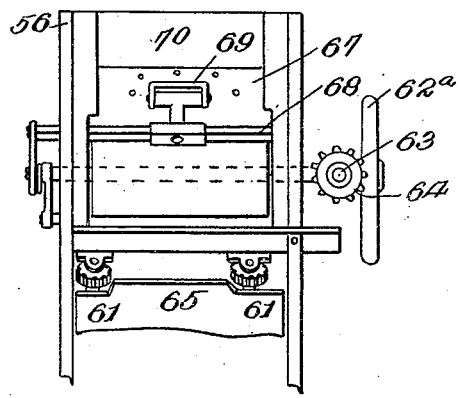
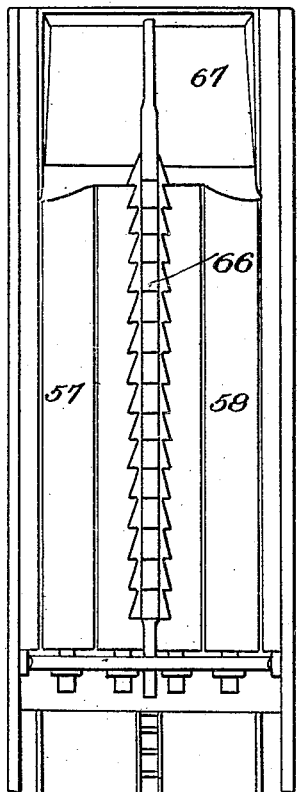
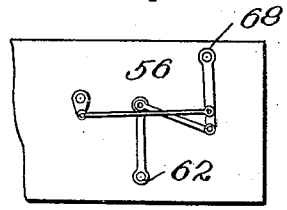
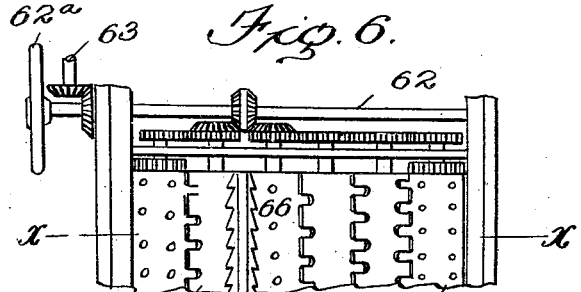
Witnesses
Cora K. Handy
Inventor
William Clouser
By
Hra B Lacey, Attorneys

UNITED STATES PATENT OFFICE.

WILLIAM CLOUSER, OF DANA, INDIANA.

HUSKING-MACHINE.

941,229. Specification of Letters Patent. Patented Nov. 23, 1909.

Original application filed January 4, 1908, Serial No. 409,322. Divided and this application filed October 6, 1908. Serial No. 456,387.

*To all whom it may concern:*

Be it known that I, WILLIAM CLOUSER, citizen of the United States, residing at Dana, in the county of Vermilion and State of Indiana, have invented certain new and useful Improvements in Husking-Machines, of which the following is a specification.

This invention is a divisional part of that for which an application for patent was filed by me in the United States on or about January 4, 1908, Serial No. 409,322, and relates to the husking mechanism, substantially as set forth hereinafter.

Referring to the drawings forming a part of the specification: Figure 1 is a side view of a corn harvester and husker embodying the invention, the elevator for loading the ears into a wagon or other receptacle being omitted. Fig. 2 is a top plan view of the machine, the upper outer portion of the elevator being broken away. Fig. 3 is a top plan view of the husking mechanism and a portion of the elevator for loading the snapped and husked ears into the wagon or receptacle. Fig. 4 is a rear view of the husking mechanism showing the means for imparting a vibratory movement to the pan and feeder. Fig. 5 is a detail view in elevation of the means for transmitting a gigging motion to the pan and feeder. Fig. 6 is a detail view of a modification, showing three pairs of husking rolls. Fig. 7 is a transverse section on the line $x$—$x$ of Fig. 6. Fig. 8 is a rear elevation of a portion of the machine showing the manner of delivering the husked ears from the snapping rolls to the husking pan.

Corresponding and like parts are referred to in the following description and indicated in all the views of the drawings by the same reference characters.

The machine is mounted upon wheels 1, 2 and 3, the latter being a caster wheel and vertically adjustable to admit of the front end of the machine being adjusted to a greater or less distance from the surface of the ground so as to pick up fallen stalks. The wheel 2 performs the double function of a support and a driver for operating the working parts of the machine, such as the snapping rolls 16 and 17, the endless feeders 35 and 36 coöperating therewith, the husking rolls 57 and 58 and the elevator 71 for loading the ears of corn into the wagon or receptacle after the same have been divested of their husks. A countershaft 6 arranged transversely of the machine in the rear thereof is connected with the drive wheel 2 by means of a sprocket chain 5 which passes around a spur wheel 4 connected with the drive wheel 2 so as to rotate therewith and around a sprocket wheel 7 loose upon the countershaft 6 and adapted to be connected therewith by means of a clutch 8. The snapping rolls 16 and 17 are geared to rotate together, and the shaft of the snapping roll 17 is extended and provided at its upper end with a bevel pinion 33 which meshes with a bevel gear 34 fast to a shaft 28 arranged transversely of the machine and receiving power from the countershaft 6 by means of a sprocket chain 51, the latter passing around a sprocket wheel 53 fast to said countershaft.

The husking mechanism is located in the rear of the machine and transversely thereof and inclines slightly to the horizontal to insure a positive feed of the ears throughout its length and from the snapping mechanism toward the elevator by means of which the husked ears are loaded into the wagon and comprises a suitable framework 56 and pairs of husking rolls 57 and 58, the rolls of each pair being driven so that their upper portions travel inward and downward so as to strip the husks from the ears and cause said husks to pass between the coöperating rolls. It is to be understood that there may be as many pairs of husking rolls as desired, two pairs being shown in Fig. 1 and the detail views thereof, and three pairs being illustrated in Figs. 6 and 7. The pairs of husking rolls are spaced apart slightly and the inner or opposing rolls are in a higher plane than the outer husking rolls, thereby tending to direct the ears of corn outward. The outer or lower husking rolls are provided with teeth 59 and the inner or higher rolls have corresponding recesses 60 to receive said teeth. The teeth 59 penetrate the husks of the ears and make positive engagement therewith so as to insure stripping or tearing of the husks from the ears. The husks, as they are stripped or torn from the ears, pass downward between the pairs of husking rolls and tend to cling to the toothed husking rolls and are removed therefrom by means of stripper rolls 61 arranged directly below the outer husking rolls. The rolls of each pair are geared at their upper ends and receive motion from a transverse shaft 62 provided with a balance wheel 62ª and geared to a shaft 63 provided at its outer end with a sprocket wheel 64 engaged by the sprocket chain 51 from which it derives motion. The clearer rolls 61 are geared at their upper ends to the outer rolls of the respective pairs. A pan 65 is located below the husking and clearer rolls to catch loose grains that may be detached from the cob so as to direct them to the elevator to be loaded into the wagon with the ears. A feeder 66 is located above the inner or higher rolls of the pairs and is ribbed at its top and opposite sides, said ribs being notched to provide teeth, the lower sides of which are abrupt and the upper sides rearwardly inclined. The feeder 66 receives a longitudinally reciprocating movement so as to advance the ears along the husking rolls. Any suitable mechanism may be employed for imparting a reciprocating movement to the feeder 66. A pan 67 is arranged over the upper ends of the husking rolls and directly below the delivery end of the elevator of the snapping mechanism so as to receive the ears delivered or dropped therefrom. The pan 67 receives a reciprocating movement lengthwise of the husking rolls and has the feeder 66 connected thereto so as to reciprocate therewith. A rock shaft 68 is connected with the pan 67 by means of an arm 69 fast to the rock shaft and a bracket 70 fast to the bottom side of the pan. The rock shaft 68 is oscillated by means of an arm 74, having its intermediate portion pivotally connected through the medium of a link 75 with a crank arm of the shaft 62, so that as the latter is rotated, the shaft 68 will be actuated to effect the oscillation of the pan. Secured to the lower end of the arm 74 is one end of a rod 76 the opposite end of which is connected to an arm 77 on the rock shaft 78, which latter is connected with the grain pan 65 so that when the upper pan 67 is oscillated, a corresponding oscillatory movement will be imparted to the lower grain receiving pan.

Having thus described the invention, what is claimed as new is:

1. The combination with co-acting husking rolls, spaced oscillating pans disposed at the opposite ends of the husking rolls and mounted for oscillation in different planes, one of said pans being adapted to receive the corn to be husked and the other loose grains, and means for transmitting motion from one pan to the other.

2. The combination with a pair of coöperating husking rolls, spaced pans disposed at the opposite ends of the husking rolls and mounted for oscillation in different planes, a feeder arranged between the husking rolls and secured to one of said pans, and means for transmitting motion from one pan to the other.

3. The combination with pairs of husking rolls, adjacent rolls being in a higher plane than the outer rolls, pans disposed at the opposite ends of the husking rolls and mounted for oscillation in different planes, a feeder arranged opposite to and directly above the space formed between said higher husking rolls and secured to one of said pans, means for oscillating the feeder carrying pan, and a connection between the feeder carrying pan and the other pan for simultaneously operating both pans.

4. The combination with pairs of coöperating husking rolls, adjacent rolls being in a higher plane than the outer rolls, oscillating pans disposed at the opposite ends of the husking rolls, and a feeder arranged opposite to and directly above the space formed between the said higher husking rolls and movable with one of said pans, said feeder comprising a toothed bar arranged to reciprocate between the husking rolls.

5. In combination, coöperating husking rolls, pans located at the upper end of the husking rolls to receive the ears of corn to be husked, a toothed feeding bar connected with said pan and arranged to operate over the husking rolls, means for imparting a reciprocating movement to said pan, a second pan disposed at the lower end of the husking rolls, and means for transmitting motion from one pan to the other.

In testimony whereof I affix my signature in presence of two witnesses.

WILLIAM CLOUSER. [L. S.]

Witnesses:
GEO. D. SUNKEL,
ALBERT AYE.